Jan. 20, 1959  J. P. VIDMAR  2,869,716
CONVEYOR BELT IDLER
Filed Jan. 3, 1957  2 Sheets-Sheet 1
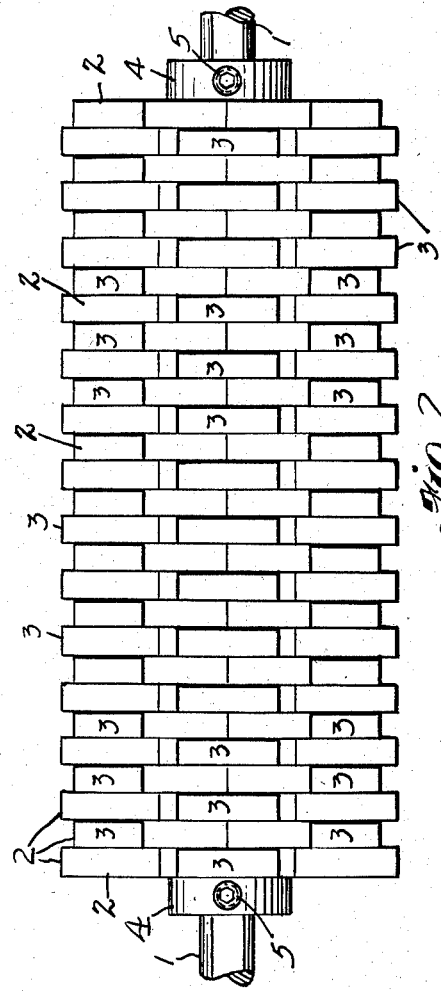
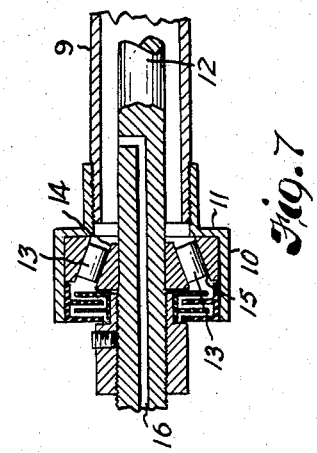
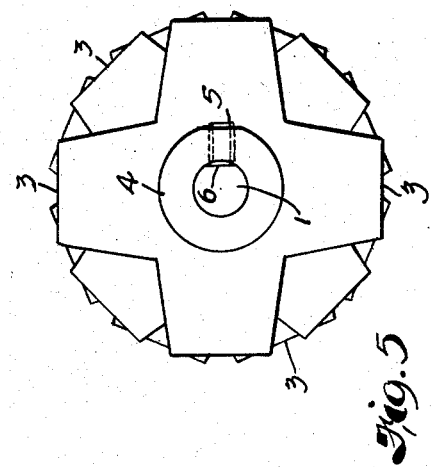
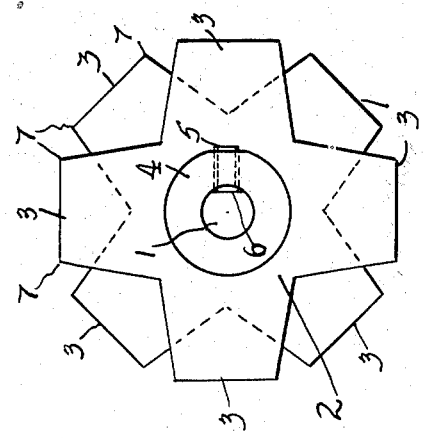
INVENTOR.
JOHN P. VIDMAR
BY
Oberlin & Limbach
ATTORNEYS.

Jan. 20, 1959  J. P. VIDMAR  2,869,716
CONVEYOR BELT IDLER
Filed Jan. 3, 1957  2 Sheets-Sheet 2
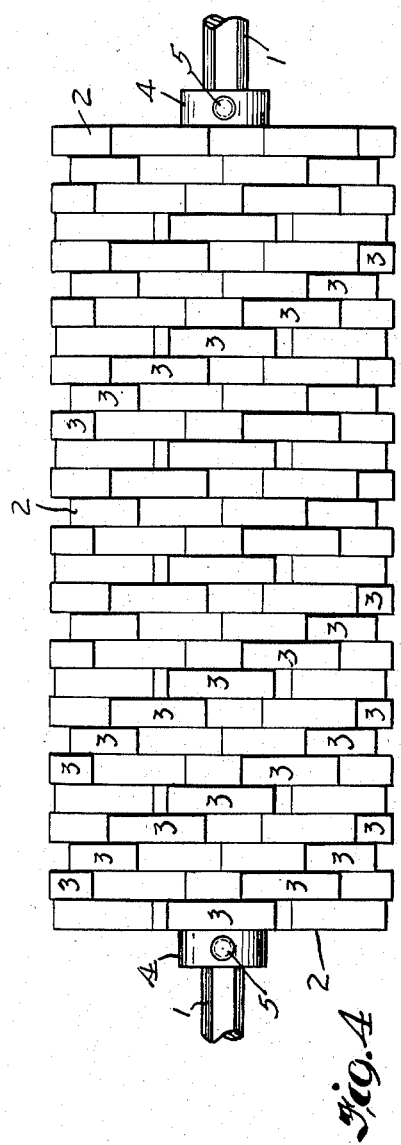
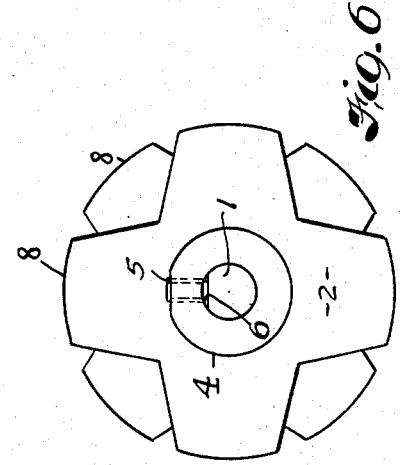
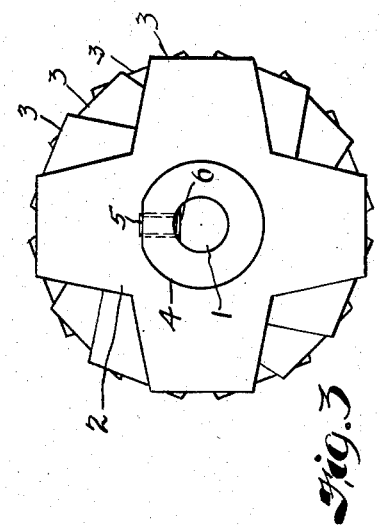
INVENTOR.
JOHN P. VIDMAR
BY
Oberlin & Limbach
ATTORNEYS.

United States Patent Office 2,869,716
Patented Jan. 20, 1959

2,869,716

CONVEYOR BELT IDLER

John P. Vidmar, Hibbing, Minn., assignor to The M. A. Hanna Company, Cleveland, Ohio, a corporation of Ohio Application January 3, 1957, Serial No. 632,393

3 Claims. (Cl. 198—230)

This invention relates as indicated to conveyor belt idlers and more specifically to idlers particularly adapted for use in supporting conveyor belts for conveying fine granulated materials.

In the past when conveyors of this type have been used to convey fine granulated materials such as iron ore, coal and sand, it has been found that particles of the material conveyed fall from the conveyor and adhere to the idlers which support the conveyor. Whenever these granules are wet or the temperature is very low, they form large solid mounds on the idlers. These mounds distort the belt which the idlers support causing more of the granulated material to fall from the conveyor. Furthermore, this distortion of the conveyor belt results in added wear to it and hence shorter life.

It is therefore the principal object of this invention to provide a conveyor belt idler to which particles of granular solids will not adhere.

It is a further object of this invention to provide an idler of the type described which is self-cleaning in that any solids adhered thereto or which fall thereon will be loosened therefrom by the action of the idler.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

In the annexed drawings:

Fig. 1 is an end view of the preferred form of idler of my invention;

Fig. 2 is a side elevational view of the idler of Fig. 1;

Fig. 3 is an end view of an alternative form of idler of my invention;

Fig. 4 is a side elevational view of the idler of Fig. 3;

Fig. 5 is an end view of another alternative form of my invention;

Fig. 6 is an end view of another alternative form of my invention; and

Fig. 7 is a cross-sectional view of a preferred axle arrangement for my new idler.

I have found that the best self-cleaning properties of an idler can be obtained by constructing it of axially juxtaposed sections made of a resiliently deformable material. Substantially all parts of the sections are able to bend with respect to adjacent sections thus loosening granular particles from their surfaces. The granular particles then fall off of the idler.

Referring to the drawings and specifically to Figs. 1 and 2, the idler of my invention comprises an axle 1 on which are mounted a plurality of resiliently deformable members 2.

Each of the members 2 has a central opening therethrough adapted to receive the axle 1. Extending from the periphery of the members 2 are a plurality of radially extending portions 3. The members 2 are mounted on the axle 1 so that the portions 3 thereof of one member are circumferentially equally spaced between the portions 3 of the members adjacent thereto. This is necessary for the following reasons.

In order to make a conveyor which will effectively clean itself while in operation, the spaces between the radially extending portions 3 must be relatively large. In order that the idler will not have a series of axially extending ridges and grooves on its periphery it is necessary for the large spaces between the portions 3 to be filled in some manner. This is accomplished in my invention by rotating each of the members 2 to a position such that its portions 3 lie circumferentially equally spaced between the portions 3 of the members adjacent to it. Furthermore, in order for the portions 3 to flex sufficiently to loosen granulated particles adherent thereto, it is necessary that they be able to flex axially to some extent; thus, if the portions 3 of all of the members 2 were adjacent to each other, the portions 3 could not bend axially and hence granulated particles might accumulate on their sides.

The resiliently deformable portions 2 are secured to the axle 1 in closely fitting axial relation by the collars 4 which are held to the axle 1 by means of the set screws 5. It should be noted that the set screws 5 abut against a flat portion 6 of the axle 1. The axle 1 is then mounted in any suitable journal below the conveyor belt.

Many materials are suitable for fabrication of the resilient members 2. The two basic requirements of such materials being that they are resiliently deformable to some extent and that they will withstand the wear to which the periphery of the idler is subjected. One of the best materials I have found for this purpose is the material from which conveyor belts are made. Thus, when a conveyor belt has worn out, the individual resilient members for the idlers may be cut out of the conveyor belt and mounted on an axle 1.

When the idler of my invention is used it is mounted below the conveyor belt and the top axially extending peripheral portion thereof supports the conveyor. The weight of the material on the conveyor belt deforms the portions 3 of the members 2. As the side and end of the portions 3 are deformed, particles adherent thereto will be loosened from the members 2 and will fall off of the idler.

Referring to Figs. 3 and 4, I have found that when the radially outward portions of the conveyor belt idler are not in straight lines axially of the idler, the effectiveness of the idler in cleaning itself is enhanced to some degree. Thus, in the idlers illustrated in Figs. 3 and 4, each of the deformable members 2 is rotated 22.5 degrees with respect to the members adjacent to it so that the portions 3 of adjacent members form helical raised portions on the periphery of the idler.

Likewise, the same design is obtained in the idler illustrated in Fig. 5 wherein each member 2 is rotated 45 degrees with respect to the members adjacent to it and each member is rotated 22.5 degrees with respect to the members separated from it by one other member 2. This form of my invention illustrated in Fig. 5 employs the generally helical raised portions on the circumference of the idler but also retains the advantages of having the portions 3 of each member 2 equally spaced between the portions 3 of the members adjacent to it.

It will be noted that in all of the idlers described above, the outward edges of the portions 3 are flat so that they have corners 7 thereon as illustrated in Fig. 1 and these corners 7 are radially outwardly from the center areas of the outer surfaces of the portions 3. It has been found that when the portions 3 have the corners 7 thereon, they will clean themselves better than they would if the portions 3 had circular outer surfaces as illustrated at 8 in Fig. 6. However, idlers having the circular outer portions 8 are contemplated within the broad idea of my invention.

When the outer surfaces of the members 2 have the corners 7 thereon, they are easier to fabricate and their self-cleaning characteristics are more pronounced for the following reason: When the conveyor belt is contacting the idler so that only one of the corners 7 of a particular member 2 contacts the conveyor belt, the top surface of the portion 3 is deformed to a greater extent than it would be if the surface were circular. When the form of my invention illustrated in Fig. 6 is used, the area of the periphery of one portion 3 which actually supports the conveyor belt at one time, is wider than such portion would be for the resilient members 2 in Figs. 1 through 5, hence the deformation of the members in Fig. 6 is not as great and their cleaning effect is hence not as great.

For the sake of simplicity the idlers in Figs. 1 through 6 have been illustrated with the rigid axles 1 and collars 4; however, I prefer to use a tubular axle as illustrated in Fig. 7 which comprises a tubular member 9 on which the resiliently deformable members 2 are mounted. A shell 10 is threaded onto each end of the tubular member 9 and has an inwardly facing shoulder 11 thereon which retains the members 2 on the tube 9. A shaft 12 extends through the tube 9 and is rigidly secured on both sides of the conveyor belt by any suitable means. The tube 9 is rotatably mounted on the shaft 12 by means of a row of roller bearings 13 which bear against corresponding conical surfaces 14 and 15 on shaft 12 and shell 10 respectively. A passageway 16 is provided in the shaft 12 whereby lubricant is injected into the tube 9, and a plurality of interlocking baffles 17 are mounted on the shaft 12 and the shell 10 providing a seal therebetween to keep lubricant within the tube 9.

My invention under operating conditions has indicated that it very effectively eliminated particle build-up on conveyor belt idlers even where the material is wet and is being handled at sub-freezing temperatures. In addition, these idlers prevent particle build-up on the under side of the conveyor belt.

Other modes of applying the principle of the invention may be employed, change being made as regards the details described, provided the features stated in any of the following claims or the equivalent of such, be employed.

I therefore particularly point out and distinctly claim as my invention:

1. An idler for conveyor belts comprising: an axle adapted to be rotatably mounted below a conveyor belt, a plurality of resiliently deformable members mounted on said axle, and means for restricting the axial movement of said members with respect to said axle, each of said members having thereon a plurality of circumferentially spaced portions extending generally radially from said axle and terminating in flat ends that have corners lying on a cylinder coaxial with said axle, the portions of adjacent members being uniformly circumferentially offset with respect to one another.

2. The idler of claim 1 characterized further in that the line connecting corresponding points on the corresponding portions of all of said members form helices coaxial with said axle.

3. The idler of claim 1 characterized further in that four of said portions are provided on each of said members, said portions are equally spaced around the circumference of each of said members, and said members are arranged in pairs on said axle, one member of each pair being rotated forty-five degrees with respect to the other member of that pair.

References Cited in the file of this patent

UNITED STATES PATENTS

| | | |
|---|---|---|
| 2,127,643 | Glossmann | Aug. 23, 1938 |
| 2,596,499 | Mercier | May 13, 1952 |
| 2,647,619 | Green | Aug. 4, 1953 |